J. GIBSON, Jr.
Fire Kindler.
No. 81,490.
Patented Aug. 25, 1868.
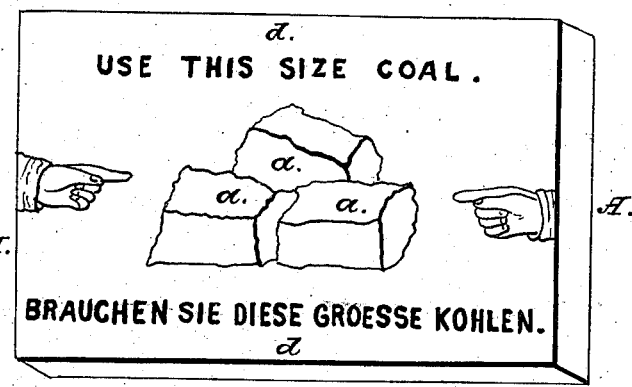
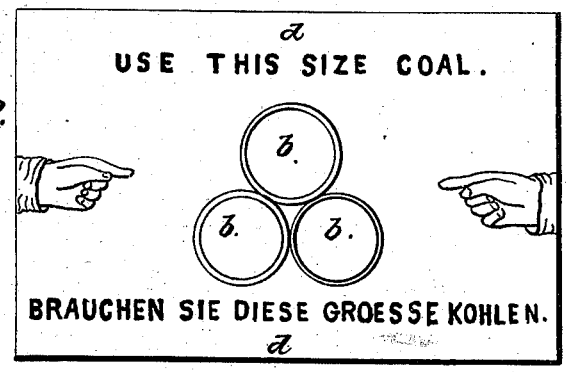

United States Patent Office.

JOHN GIBSON, JR., OF ALBANY, NEW YORK.

Letters Patent No. 81,490, dated August 25, 1868.

---

FUEL-SIZE INDICATOR.

---

The Schedule referred to in these Letters Patent and making part of the same.

---

TO ALL WHOM IT MAY CONCERN:

Be it known that I, JOHN GIBSON, Jr., of the city of Albany, county of Albany, and State of New York, have invented a new and useful device, whereby the size of fuel proper to be used in a stove, heater, or furnace, or the like, shall be indicated by a representation of the size of such fuel upon some part or appendage of such stove, heater, furnace, or the like; and I do hereby declare that the following is a full, clear, and exact description thereof, reference being had to the accompanying drawings, forming a part of this specification, in which—

Figure 1 represents a section of a stove or heater with such device thereon.

Figure 2 represents a similar device made in outline, indicating size of fuel to be used.

Figure 3 represents a device for indicating size of fuel by stating measurement in inches, or the like.

The nature of my invention consists in affixing to a stove, heater, furnace, or the like, or in affixing to any of the appurtenances thereof, any representation of the size of fuel proper to be used in such stove or heater.

Such representations of size may be fac-similes in size and form of such fuel, and may be made of metal, either struck or cast, and attached to any portion of the stove or heater, or to any of its appendages, or may be cast solid with said stove or heater, or any part thereof.

Or, instead of the full fac-simile form and size of fuel, outline sizes only may be used, as aforesaid.

Or, again, measurement only may be given, as, for instance, "Use coal 1-in. diam.," "2-in. diam.," or any equivalent indication of size.

In connection with the aforesaid visible indication or representation of size of fuel proper to be used, there may be affixed or used words, in one or more languages, as "Use this size coal," or equivalent words. These words or directions may be connected with and form a part of the piece on which the visible sizes of fuel are represented, or may be placed or used elsewhere on said stove, heater, or appendages thereof.

To enable others skilled in the art to make and use this invention, I will proceed to describe it, in reference to the accompanying drawings, and the letters of reference marked thereon, the same letters indicating like parts.

A, fig. 1, represents a section of a stove or heater, with the fac-simile representations, $a\ a\ a$, of form and size of fuel to be used.

These representations, $a\ a\ a$, may be struck or cast, and attached to stoves and the like, or may be cast solid with said stoves, or any appendage thereof.

Or, as in fig. 2, outline-size representations, $b\ b\ b$, may be used, instead of the fac-simile representations $a\ a\ a$.

Or representations, as $c$, fig. 3, indicating measurement of size of fuel by figures, or equivalents, may be used; and any of these visible representations or equivalents, on any stove, heater, or furnace, would indicate the proper size of fuel to be used, corresponding with the construction of such stove or heater, as designed by the manufacturer.

To give force and make explicit the visible-size representations, $a$, $b$, or $c$, of fuel proper to be used, I connect with said representations the words $d\ d$, or equivalent directions.

The said words may be in one or more languages, and may be struck or cast, and form a part of the same piece with the size representations $a$, $b$, or $c$, or may be separate from such representations, and located in any other suitable place on said stove or heater, or its appendages.

If desirable, any of the size representations, $a$, $b$, or $c$, may be made on a detachable piece, either with or without the accompanying words, $d\ d$, and such detachable piece may be used to carry to the coal-dealer, to order correct size of fuel by.

As the perfect combustion of the fuel, and the satisfactory working of a stove or heater, depend, in a great degree, upon using fuel of a size corresponding with its fire-pot and grate, manufacturers have, in many cases, attached to their stoves or heaters, directions, as follows, viz, "Use nut-coal," "Use chestnut-coal," "Use egg-size coal," and the like; and as these terms, in many localities, do not indicate the proper size of fuel intended to be used by the manufacturer of the stoves or heaters, this non-agreement of the size of fuel with the construction of the stove or heater often leads to the condemnation and rejection of such stove or heater, whereas a positive representation, as *a*, *b*, or *c*, of the proper size of fuel, attached to any part of the stove or its appendages, and coupled with the worded directions *d d*, in English, German, French, or other language, would, in all parts of the country, give to people of different nationalities positive, pointed, and infallible directions as to the proper size of fuel to be used in such stove or heater.

When the size-fuel representation, with or without the worded directions, is made detachable, such size representation could be carried and shown to the coal-dealer, as unmistakably indicating the size of coal wanted for such stove or heater.

Or, if outline or measurement-size fuel representations are permanently attached, such size representations may be transferred to paper by placing said paper in contact with such size representation of fuel, and rubbing said paper while in contact, and this paper could be taken to a coal-dealer, as indicating correctly the size of fuel wanted.

Having described my invention, I do not claim the use of directions, by terms, on stoves or heaters, such as "Use nut-size coal," "Use egg-coal," &c., as they have been used; but

What I claim, and desire to secure by Letters Patent, is—

1. The size-representations, *a a a*, of fuel, fac-similes in form and size, or outline-size representations *b b b*, or measurement-size representation *c*, or any fuel-size representations equivalent thereto, cast solid with or attached to any stove, heater, furnace, or the like, or cast with or attached to any part or appendage of such stove or heater, as and for the purpose set forth and described.

2. The fuel-size representations or indications *a*, *b*, or *c*, or their equivalents, attached permanently to any stove or heater, or when made detachable, either with or without the words *d d*, or their equivalents, as and for the purpose set forth and described.

3. The words *d d*, or their equivalents, in one or more languages, when used on any stove or heater, or on any appendage thereof, in connection with a fuel-size representation, *a*, *b*, or *c*, or their equivalent fuel-size representation, as and for the purpose set forth and described.

JOHN GIBSON, Jr.

Witnesses:
ALEXANDER SELKIRK,
J. H. GIBSON.